United States Patent
Muthiah et al.

(10) Patent No.: US 11,902,656 B2
(45) Date of Patent: Feb. 13, 2024

(54) AUDIO SENSORS FOR CONTROLLING SURVEILLANCE VIDEO DATA CAPTURE

(71) Applicant: Western Digital Technologies, Inc., San Jose, CA (US)

(72) Inventors: Ramanathan Muthiah, Bangalore (IN); Akhilesh Yadav, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/852,718

(22) Filed: Jun. 29, 2022

(65) Prior Publication Data
US 2024/0007744 A1 Jan. 4, 2024

(51) Int. Cl.
H04N 23/667 (2023.01)
H04R 1/32 (2006.01)
H04N 7/18 (2006.01)
H04N 23/69 (2023.01)
H04N 23/695 (2023.01)

(52) U.S. Cl.
CPC ........... *H04N 23/667* (2023.01); *H04N 7/188* (2013.01); *H04N 23/69* (2023.01); *H04N 23/695* (2023.01); *H04R 1/326* (2013.01)

(58) Field of Classification Search
CPC .... H04N 23/667; H04N 23/69; H04N 23/695; H04N 7/188; H04R 1/326
USPC ...................................................... 348/222.1
See application file for complete search history.

(56) References Cited

U.S. PATENT DOCUMENTS

| | | | |
|---|---|---|---|
| 7,697,827 B2 * | 4/2010 | Konicek | G03B 29/00 348/211.1 |
| 8,824,879 B2 * | 9/2014 | Konicek | G03B 29/00 396/56 |
| 9,031,847 B2 * | 5/2015 | Sarin | G06F 3/167 704/275 |
| 10,230,884 B2 * | 3/2019 | Okada | H04N 5/77 |
| 10,855,921 B2 * | 12/2020 | Milne | H04N 23/667 |
| 10,885,342 B1 * | 1/2021 | Day | G10L 15/08 |
| 10,897,627 B2 | 1/2021 | Muthiah | |
| 11,619,991 B2 * | 4/2023 | Kelly | G10L 15/22 345/156 |
| 2005/0102133 A1 * | 5/2005 | Rees | G03B 17/38 348/E5.043 |
| 2005/0128311 A1 * | 6/2005 | Rees | G03B 17/38 348/E5.042 |

(Continued)

FOREIGN PATENT DOCUMENTS

CN 109300471 A 2/2019
JP 2015104028 A 6/2015

*Primary Examiner* — Pritham D Prabhakher
(74) *Attorney, Agent, or Firm* — PATENT LAW WORKS LLP

(57) ABSTRACT

Systems, video cameras, and methods for using audio sensors to control surveillance video capture are described. A video camera and audio sensor are deployed so that the audio sensor has an audio field that is at least partially outside the field of view of the video camera. The audio sensor collects audio data from the audio field and a controller for the video camera uses audio events from the audio data for modifying the video capture operations of the video camera. Video data is then captured based on the modified video capture operations, such as initiating video capture, changing the video capture rate, or changing the camera position.

20 Claims, 7 Drawing Sheets

(56) References Cited

U.S. PATENT DOCUMENTS

| | | | |
|---|---|---|---|
| 2013/0036628 A1* | 2/2013 | Hussey | A43B 3/0078 |
| | | | 36/87 |
| 2013/0124207 A1* | 5/2013 | Sarin | G06F 3/167 |
| | | | 704/E11.001 |
| 2013/0314543 A1* | 11/2013 | Sutter | H04N 7/144 |
| | | | 348/E7.085 |
| 2014/0028826 A1* | 1/2014 | Lee | G10L 15/25 |
| | | | 348/77 |
| 2014/0160316 A1* | 6/2014 | Hwang | H04N 1/00403 |
| | | | 348/231.99 |
| 2014/0192211 A1* | 7/2014 | Konicek | H04N 1/2112 |
| | | | 348/207.1 |
| 2017/0085772 A1* | 3/2017 | Okada | H04N 5/77 |
| 2018/0007323 A1 | 1/2018 | Botusescu et al. | |
| 2018/0165520 A1* | 6/2018 | Meisser | H04N 7/147 |
| 2019/0156849 A1* | 5/2019 | Feng | G01S 3/8083 |
| 2019/0258865 A1* | 8/2019 | Ernesti | G06V 20/10 |
| 2021/0048883 A1* | 2/2021 | Kelly | G06F 3/165 |
| 2021/0201933 A1 | 7/2021 | Kang | |
| 2021/0289168 A1 | 9/2021 | Glückert et al. | |
| 2023/0031871 A1* | 2/2023 | Shroff | H04N 23/62 |

* cited by examiner

AUDIO SENSORS FOR CONTROLLING SURVEILLANCE VIDEO DATA CAPTURE

TECHNICAL FIELD

The present disclosure generally relates to video surveillance systems and, more particularly, to video surveillance systems configured to control video capture parameters based on other sensor input.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. In some configurations, video may be recorded in onboard memory of the cameras, with or without transfer to a server. Client or user systems are communicatively connected to the server system and/or cameras to request, receive, and display streams of recorded video data and/or related alerts and analytics.

An increasing number of video surveillance applications use object detection and recognition, such as facial recognition, based on discrete objects identified in a video stream. Due to the high cost of storage for surveillance applications, including continuous surveillance, video cameras may include features to selectively capture high quality video. For example, once an object, motion, or similar visual condition is detected, the camera may modify its video capture operations to capture high quality data. These modifications of video capture operations may include initiating data capture, such as where a light or motion sensor provides the visual condition, changing the video capture rate from a lower video capture rate to a higher video capture rate, and/or moving the field of view of the camera using zoom and/or pan-tilt-zoom (PTZ) capabilities.

While such trigger conditions reduce video data usage, they may also delay object detection, miss fast moving objects, miss data objects that are more difficult to detect at lower capture rates, miss objects within PTZ range that do not cross a current field of view, and/or miss early portions of a video event of interest (which may include critical angles, lighting, or other image features to support object recognition).

Systems and methods for preemptively modifying video capture operations for selective capture of objects of interest may be advantageous. A reliable and efficient way of using audio data to initiate modification of video capture operations before an object is detectable in the field of view of the video camera may be needed.

SUMMARY

Various aspects for controlling selective capture of surveillance video streams using audio sensors, particularly using audio events to modify video capture operations, are described.

One general aspect includes a system also including: a video camera; an audio sensor, where the audio sensor is configured to collect audio data from an audio field and the audio field is at least partially outside a field of view of the video camera; and a controller. The controller is configured to: receive audio data from the audio sensor; determine, from the audio data, an audio event; modify, responsive to the audio event, a video capture operation of the video camera; and capture, using the video camera, video data based on the video capture operation.

Implementations may include one or more of the following features. The video camera may be configured for a plurality of video capture rates and the controller may be further configured to: select a first video capture rate from the plurality of video capture rates during a first operating period; and select, responsive to the audio event, a second video capture rate to modify the video capture operation during a second operating period. The controller may be further configured to: suspend video capture during a first operating period; and initiate, responsive to the audio event, video capture at a selected video capture rate to modify the video capture operation during a second operating period. The audio event may be associated with a video object of interest and the audio event may precede the video object being detectable in the field of view of the video camera. The audio sensor may include at least one directional microphone configured with a direction and an audio range to detect sound sources outside the field of view of the video camera; and the controller may be further configured to determine, based on the audio data, a direction of movement of a sound source that intercepts the field of view of the video camera. The at least one directional microphone may be configured as an audio tripwire for the sound source approaching the field of view of the video camera. The system may include an analytics engine configured to: receive the audio data from the audio sensor; determine, in the audio data, the audio event, where determining the audio event is based on an audio recognition value meeting an audio recognition threshold and an audio duration value meeting an audio duration threshold; and return the audio event for use by the controller. The analytics engine may be further configured to use an audio recognition model to determine the audio recognition value; the audio recognition model may be configured to classify the audio data using at least one audio source type identifier; and the controller may be further configured to use the at least one audio source type identifier to determine a modification of the video capture operation of the video camera. The analytics engine may be further configured to use an audio recognition model to determine the audio recognition value; the audio recognition model may be configured to determine a location and direction of movement of a sound source; and the controller may be further configured to send, responsive to the location and direction of movement of the sound source, a pan-tilt-zoom position control signal to the video camera to adjust the field of view of the video camera. The analytics engine may be further configured to use an audio recognition model to determine the audio recognition value; the audio recognition model may be a machine learning model trained with audio reference data corresponding to known sound sources; the controller may be further configured to detect, using the video data, at least one data object in the field of view of the video camera and determine, based on correlations of the audio event and detecting at least one data object, additional audio reference data; and the analytics engine may be further configured to retrain the machine learning model using the additional audio reference data.

Another general aspect includes a computer-implemented method including: collecting, by an audio sensor, audio data from an audio field, where the audio field is at least partially outside a field of view of a video camera; receiving the audio data from the audio sensor; determining, from the audio data, an audio event; modifying, responsive to the audio event, a video capture operation of the video camera; and capturing, using the video camera, video data based on the video capture operation.

Implementations may include one or more of the following features. The computer-implemented method may include: selecting a first video capture rate from a plurality of video capture rates for the video camera during a first operating period; and selecting, responsive to the audio event, a second video capture rate to modify the video capture operation during a second operating period. The computer-implemented method may include: suspending video capture during a first operating period; and initiating, responsive to the audio event, video capture at a selected video capture rate to modify the video capture operation during a second operating period. The audio event may be associated with a video object of interest; and the audio event may precede the video object being detectable in the field of view of the video camera. The computer-implemented method may include determining, based on the audio data, a direction of movement of a sound source that intercepts the field of view of the video camera, where the audio sensor may include at least one directional microphone configured with a direction and an audio range to detect sound sources outside the field of view of the video camera. The computer-implemented method may include: determining, based on the audio data, an audio recognition value; and determining the audio event based on the audio recognition value meeting an audio recognition threshold. The computer-implemented method may include: determining the audio recognition value using an audio recognition model; classifying, using the audio recognition model, the audio data using at least one audio source type identifier; and determining, using the at least one audio source type, a modification of the video capture operation of the video camera. The computer-implemented method may include: determining the audio recognition value using an audio recognition model; determining, using the audio recognition model, a location and direction of movement of a sound source; and adjusting, responsive to the location and direction of movement of the sound source, the field of view of the video camera using a pan-tilt-zoom position control signal. The computer-implemented method may include: determining the audio recognition value using an audio recognition model; training, using a machine learning model and audio reference data corresponding to known sound sources, the audio recognition model; detecting, using the video data, at least one data object in the field of view of the video camera; determining, based on correlations of the audio event and detecting at least one data object, additional audio reference data; and retraining, using the machine learning model and the additional audio reference data, the audio recognition model.

Still another general aspect includes a storage system including: a video camera; an audio sensor, where the audio sensor is configured to collect audio data from an audio field and the audio field is at least partially outside a field of view of the video camera; a processor; a memory; means for collecting, by the audio sensor, audio data from the audio field; means for determining, from the audio data, an audio event; means for modifying, responsive to the audio event, a video capture operation of the video camera; and means for capturing, using the video camera, video data based on the video capture operation.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve selective capture of surveillance video data by using audio data from audio sensors to trigger modifications of video capture operations. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
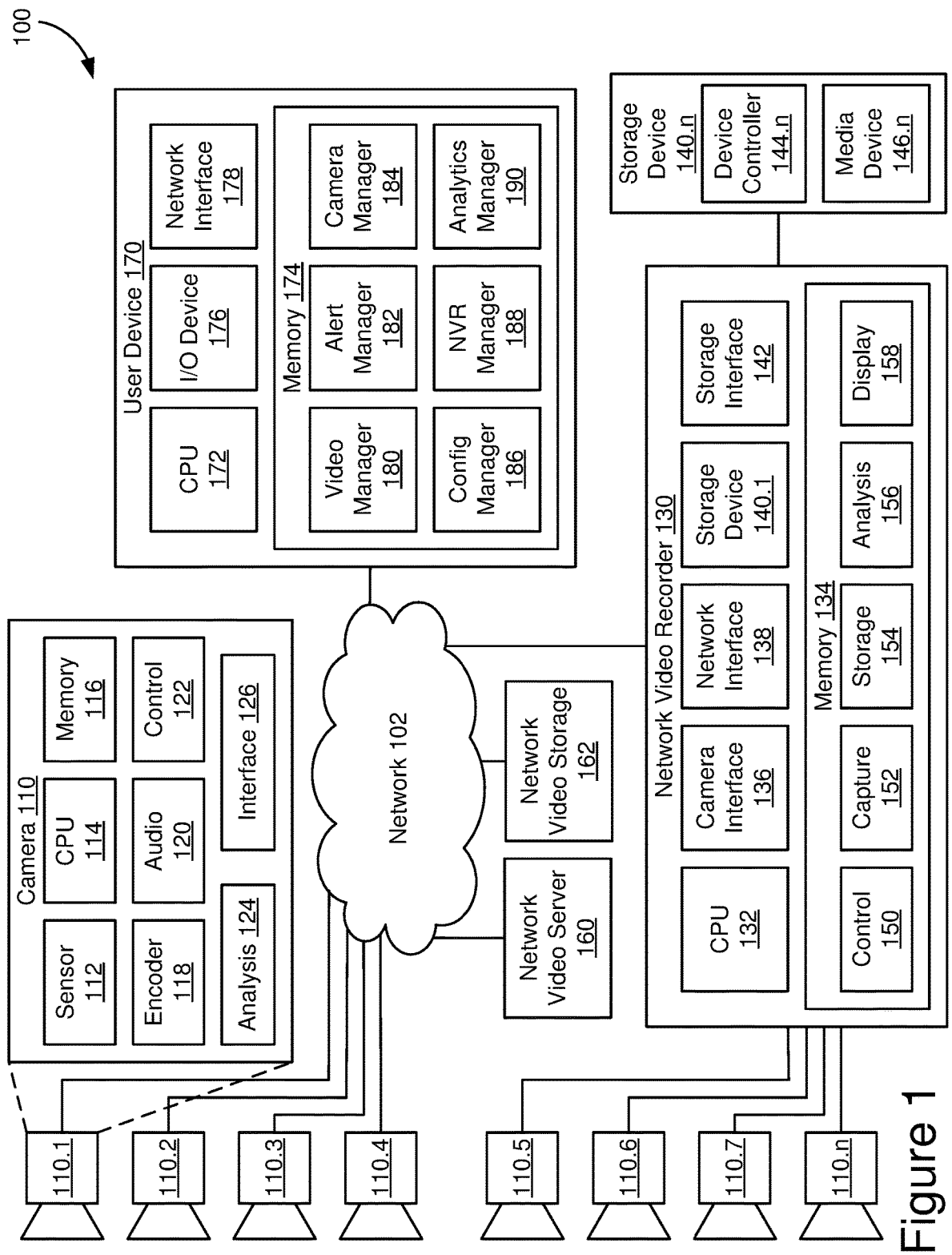
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.*n* in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.*n*, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded, synchronized, and/or independent audio streams with their respective video streams. In some embodiments, video cameras 110 may include an image sensor 112, a processor or central processing unit CPU 114, a memory 116, an encoder 118, an audio channel 120, a control circuit 122, and/or a network interface 126. In some embodiments, video cameras 110 may include onboard analytics, such as a video analysis subsystem 124.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. In some embodiments, multiple image sensors are supported by the same circuit board and/or processing subsystem containing CPU 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream and/or as an independent audio data stream. In some embodiments, one or more microphones may be enabled to capture audio data in parallel with the image data captured by image sensor 112 and/or may operate to capture audio data even when image sensor 112 is not actively capturing video data. For example, one or more microphones may be configured with an audio sensor that captures sound waves and converts them into a time-based audio data stream for an audio field in the vicinity of the video camera. In some embodiments, audio channel 120 may be receive audio data from one or more directional microphones configured to receive sound waves from an audio field, determined by the direction and audio range of the directional microphone, that extends outside the field of view of the video camera and may include one or more approach paths to the video camera field of view. In some embodiments, encoder 118 may include an audio encoder that operates in conjunction with the video encoder to encode a synchronized audio data stream in the video stream. For example, the video format used by encoder 118 may include one or more audio tracks for encoding audio data to accompany the image data during video stream playback. In some embodiments, encoder 118 may include a separate audio encoder for independently encoding an audio data stream that may be provided through audio channel 120 for data analysis independent of the video data.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may respond to audio data and, more specifically, audio events detected from the audio data that correlate to audio sources that are not currently in the field of view of the image sensor. For example, the location and direction of movement of a sound source may be used by control circuit 122 to adjust the position of video camera 110 and/or a PTZ control signal may be received from network video recorder 130 based on analysis of the audio data. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion and/or audio detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support audio event detection and/or object detection. For example, video analysis subsystem 124 may receive an audio data stream from audio channel 120, detect an audio event, and initiate encoder 118 and/or control circuit 1222 to modify video capture operations prior to an object of interest entering the field of view of camera 110. Based on the modified video capture operations, video camera 110 may capture high quality video data for analysis by video analysis subsystem 124. Video analysis subsystem 124 may receive a video stream (from sensor 112 and encoder 118), detect an object, and determine whether an object detection event has occurred.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives. In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.n may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, camera control subsystem 150 may receive audio data from one or more microphones associated with cameras 110 and/or the location(s) in which cameras 110 are deployed. For example, each camera 110 may include one or more directional microphones configured to capture audio data from an audio field adjacent to and extending beyond the field of view of each camera. In some embodiments, one or more microphones may be placed separately from cameras 110 to provide an audio field for identified paths of approach to one or more video camera fields of view. For example, directional microphones may be placed as audio tripwires adjacent points of ingress to an area being monitored by one or more of cameras 110 and/or used to bound the area being monitored to detect sound sources approaching from any direction. In some embodiments, audio data received by camera control subsystem 150 may be relayed to storage subsystem 154 for audio data storage and/or analysis subsystem 156 for audio event detection. In some embodiments, audio data may be received by video capture subsystem 152 as an audio track embedded in or associated with a video data stream. For example, video capture subsystem 152 may receive video data that includes an audio track or channel and direct the audio data to camera control system 150, storage subsystem 154, and/or analysis subsystem 156.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc. In some embodiments, video storage subsystem may store embedded audio data with the video data and/or may store audio data in separate audio data files or objects.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events and/or audio events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, use device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2A:
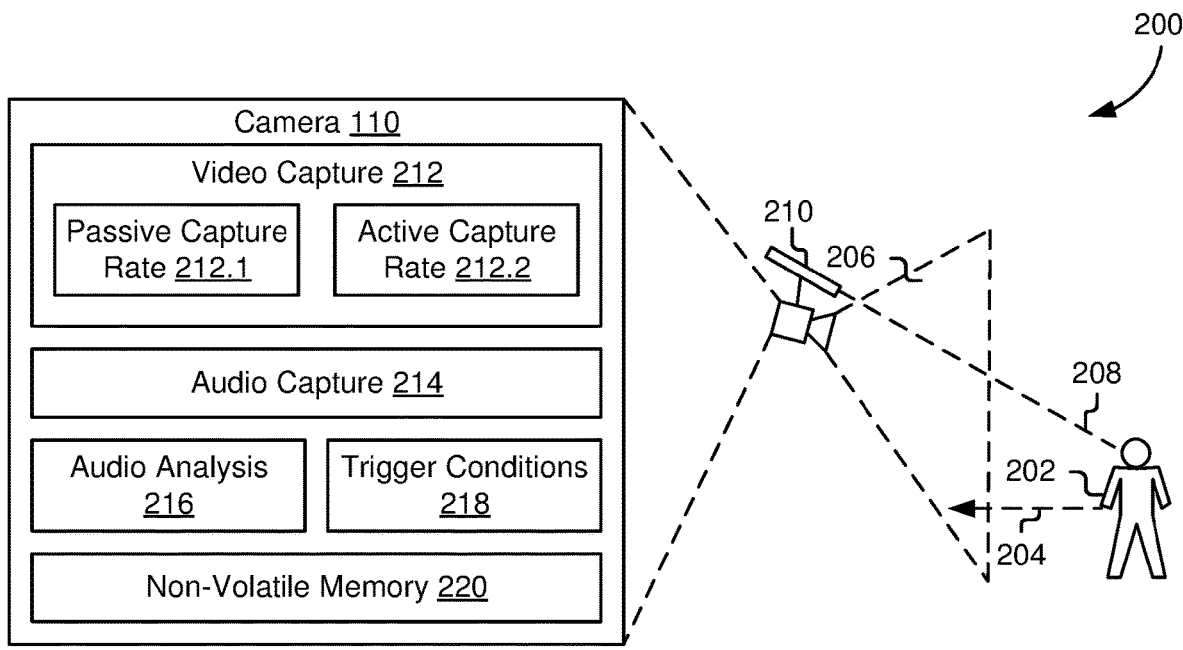
FIG. 2 schematically illustrates a video camera configured for using audio sensors to modify video capture operations that may be used by the computer-based surveillance system of FIG. 1.
Figure 2B:
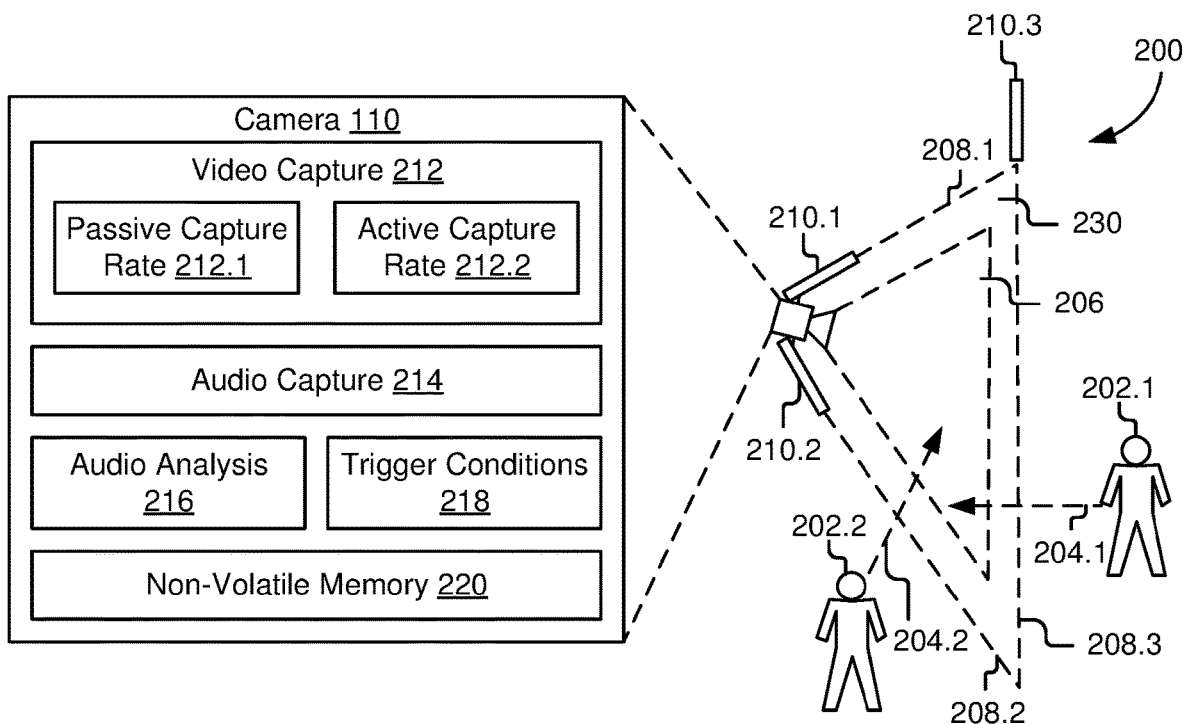

FIGS. 2A and 2B show schematic representations of two example microphone configurations for modifying video capture operations based on audio events that may be implemented in a computer-based surveillance system 200, such as surveillance system 100 in FIG. 1. In the example configurations shown, camera 110 is configured for onboard capture and analysis of audio data, but similar functions may be implemented through a network video recorder, such as network video recorder 130 described above.

Camera 110 has been deployed to monitor a field of view 206 for object detection and related object detection event handling, such as alerts, selective archival storage, etc. For example, camera 110 may be placed in a surveillance location to detect object of interest 202 (in this case, a person) when it moves into field of view 206 along path of movement 204. Other example objects of interest may include vehicles, animals, equipment, etc. In some embodiments, camera 110 may be configured for video capture 212 based on different video capture rates. For example, camera 110 may include a passive video capture rate 212.1 that includes lower quality video (e.g., lower pixel count and/or frame rate) to save storage space and/or network bandwidth for operating periods when no objects of interest are likely to be present in the field of view. Camera 110 may include an active video capture rate 212.2 that includes higher quality video (e.g., higher pixel count and/or frame rate) to provide better video data for analysis, display, and/or storage of possible object detection events.

In FIG. 2A, camera 110 has been deployed with a directional microphone 210 providing an audio field 208 that extends beyond field of view 206. As a result, sound waves generated by a sound source, such as object of interest 202, may be detected before object of interest enters field of view 206. For example, directional microphone 210 may be directed at a known point of ingress toward field of view 206, but outside of field of view 206. Camera 110 may be configured for audio capture 214 from microphone 210. For example, microphone 210 may be built into camera 110, plugged into an audio interface of camera 110, or be configured for wireless audio data transmission (e.g., via wi-fi, Bluetooth, etc.). Camera 110 may include audio analysis 216 for analyzing the audio data for audio events indicating an approaching object of interest 202. For example, sounds generated by the movement of object of interest 202 may captured and analyzed to determine the sound source type, location, and direction of travel, as well as confidence and duration metrics for filtering out unreliable possible audio events. In some embodiments, the audio event parameters from audio analysis 216 may be evaluated against one or more trigger conditions 218 for modifying video capture 212. For example, trigger conditions 218 may include a set of threshold values for evaluating audio event quality (e.g., confidence and time) with desired sounds source types on a predicted intercept path with field of view 206. If trigger conditions 218 are met, video capture 212 may switch from passive capture rate 212.1 to active capture rate 212.2 for capturing and storing video data in non-volatile memory 220. In some embodiments, initiating active capture rate 212.2 may also change the storage location, such as directing captured video data from local non-volatile memory 220 to network storage in a network video recorder or network video storage.

In FIG. 2B, camera 210 has been deployed with multiple directional microphones 210.1, 210.2, and 210.3 with corresponding audio fields 208.1, 208.2, and 208.3 that define a combined audio field 230 that extends beyond and surrounds field of view 206. In some configurations, each directional microphone 210.1-210.3 may be configured as an audio tripwire to enable audio analysis 216 to determine when a sound source crosses the respective audio fields 208.1-208.2 and analyze the resulting audio events for trigger conditions 218. As a result, objects of interest 202.1 and 202.2 on respective paths of movement 204.1 and 204.2 may be detected by camera 110 before they enter field of view 206, despite their different approach paths. Other configurations of ambient and/or directional microphones are possible for monitoring areas adjacent the field of view of a camera for objects of interest on an intercept path with the field of view.

Figure 3:
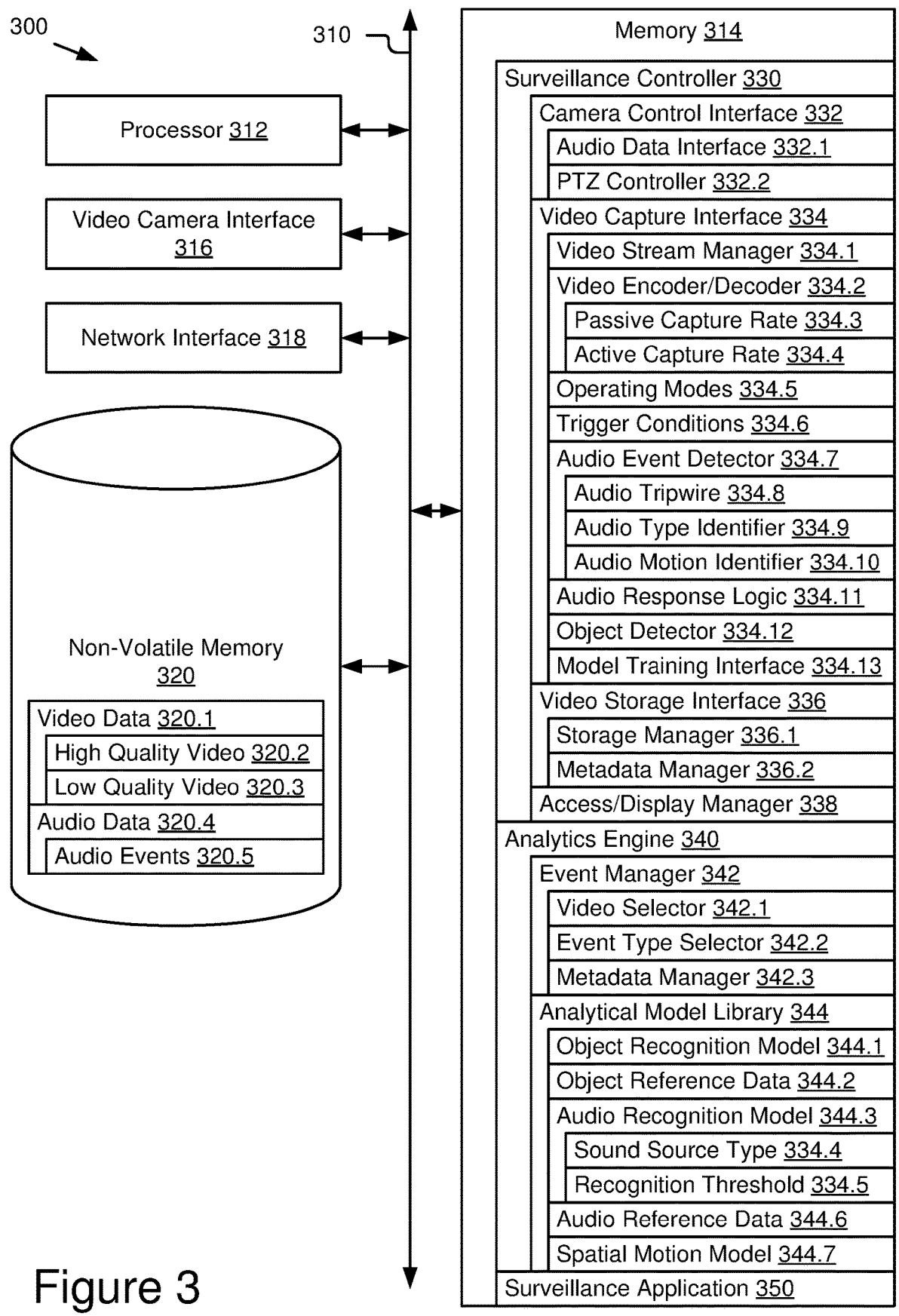
FIG. 3 schematically illustrates some elements of the computer-based surveillance system of FIG. 1.

FIG. 3 schematically shows selected modules of a surveillance system 300 configured for using audio data to modify the video capture operations of the cameras. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of surveillance controller 330 and/or those functions may be shared between the video camera controller and a network video recorder or video surveillance as a service (VSaaS) server. Similarly, some or all of analytics engine 340 may instantiated in the video camera and/or shared with other surveillance system components.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by video cameras and/or a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350. In some embodiments, some or all functions of surveillance controller 330 may be onboard each video camera and no network video recorder may be required.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include an audio data interface 332.1 for receiving audio data associated with one or more cameras. For example, audio data interface 332.1 may include an audio channel for receiving analog or digital audio data from a microphone attached to the video camera. This may include a built-in audio sensor in the video camera or an externally attached microphone, such as an external directional microphone. Audio data interface 332.1 may include a hardware connector, such as an audio port, for wired attachment to the microphone and/or support wireless communication with one or more microphones, such as using wi-fi or Bluetooth wireless protocol standards. In some embodiments, audio data interface 332.1 may provide audio data to video capture interface 334 for inclusion in the encoded video data and/or to provide a separate audio data stream for use in audio event detection. In some embodiments, audio data interface 332.1 may include a command interface for remotely adjusting audio control parameters for the microphones, such as gain, equalization, filtering, etc., and/or enabling or disabling the microphones. The audio control parameters for one or more microphones may be part of the configuration tables for an associated camera.

In some embodiments, camera control interface 332 may include a PTZ controller 332.2 for one or more video cameras. For example, each video camera may be equipped with a PTZ control unit and associated motor and/or digital controllers and command interface for moving that video camera from its current position to pan, zoom, and/or tilt to change the field of view. In some embodiments, PTZ controller 332.2 may include a remote controller unit that sends PTZ control commands to adjust camera position and/or zoom in real-time, such as responsive to the detection of an object of interest in the field of view (but not ideally positioned in the field of view). In some embodiments, PTZ controller 332.2 may include a set of configuration settings for auto-tracking or auto-capture functions within the selected video camera. For example, one or more cameras may include an auto-capture feature for detecting objects of interest and then centering and zooming on the detected object. PTZ controller 332.2 may be used to configure the parameters of the auto-capture feature, such as classes of objects (e.g., humans, human faces, vehicles, license plates, etc.) to be captured, PTZ ranges or limits, timing, quality or reliability thresholds, etc. In some embodiments, PTZ controller 332.2 may be configured for responding to audio events that are outside the current field of view of the camera. For example, responsive to an audio event for an approaching sound source, PTZ controller 332.2 may be commanded to pan the camera toward the audio event or an anticipated intercept point of an object of interest in the adjusted field of view.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, each video camera configured as a primary video camera may have a dedicated video channel for their respective primary video streams. Video capture interface 334 may be configured to pass each received video stream to video storage interface 336, analytics engine 340, and/or access/display manager 338. For example, received video streams may be buffered by video capture interface before being streamed to video storage interface 336, analytics engine 340, and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components. In some embodiments, video capture interface 334 may support an audio channel or audio track for audio data synchronized to the captured video data. For example, one or more video formats supported may include one or more audio channels for audio data from one or more microphones associated with the video camera. In some embodiments, video capture interface 334 may use audio data and/or audio events detected from the audio data to trigger changes in video capture operations, such as video capture operating modes and video capture rates.

In some embodiments, video capture interface 334 may include a video stream manager 334.1 configured to identify and manage the plurality of video streams being received from the cameras. For example, video stream manager 334.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths. For example, the storage path (through video storage interface 336), the display path (through access/display manager 338), and/or the analytics path (through analytics engine 340) may each be configured for specific processing, priority, and timing. In some embodiments, one or more selectable storage paths and corresponding storage locations may be associated with different video capture operating modes and/or video capture rates and may be selected in response to triggers, such as audio event triggers.

In some embodiments, video stream manager 334.1 may be configured to use encoder/decoder 334.2 to encode camera video streams in a desired video format. In some embodiments, encoder/decoder 334.2 may be configured to receive the raw video data stream from the image sensor and determine the video data format to be used, including a capture rate of the raw data from the image sensor. For example, the video capture rate may include a number of pixels or resolution of the image data from the image sensor and a frame rate determining how frequently the pixel values are determined. In some embodiments, encoder/decoder 334.2 may support two or more selectable video capture rates and corresponding video formats. For example, encoder/decoder 334.2 may support a passive video capture rate 334.3 and an active video capture rate 334.4. Passive video capture rate 334.3 may have a lower rate than active video capture rate 334.4 such that passive video capture rate 334.3 captures less video data (e.g., low quality video 320.3) and requires less processing, network bandwidth, and/or data storage, but with lower video quality that may be less effective for display and/or analytics. Active video capture rate 334.4 may capture more video data with higher video quality (e.g., high quality video 320.3) for display and analytics, but at the cost of increased processor use, network bandwidth, and/or data storage. In some embodiments, video encoder/decoder 334.2 may support more than two selectable video capture rates. In some embodiments, in camera video encoders may encode video data from the image sensor in a first (camera) video format and video stream manager 334.1 may use encoder/decoder 334.2 to re-encode them in one or more other formats. For example, video stream manager 334.1 may use encoder/decoder 334.2 to change the resolution, image size, frame rate, codec, compression factor, color/gray-scale, or other video format parameters. In some embodiments, video encoder/decoder 334.2 may be used to decode and extract audio data from a video data stream that includes an audio channel. For example, the audio channel may be separated and decoded to determine an audio data stream for use by audio event detector 334.7.

In some embodiments, video capture interface 334 may include a plurality of operating modes 334.5. For example, a standby operating mode may include a low power state in which the video camera is not actively capturing video and a normal operating mode may include a normal power state where the video camera may activate any of its resources, including capturing video using its image sensor and processor. In some embodiments, operating modes 334.5 may include an audio only mode, where the image sensor is disabled, but audio data may still be collected, encoded, and processed. In some embodiments, operating modes 334.5 may include low light operating modes for low light conditions, motion/tripwire-only modes where only low-level processing of image sensor data (or a separate motion sensor) is active without video capture, and other operating modes. In some embodiments, one or more operating modes may be associated with specific video capture rates and encoding formats. For example, a passive video capture mode may use passive video capture rate 334.3 and an active video capture mode may use active video capture rate 334.4. Video cameras may be use different operating modes during different operating periods and operating modes may be used to modify one or more video capture operations. For example, each operating mode may define whether or not video capture is suspended or operating and, if operating, what set of video capture parameters are being used, such as video capture rate (resolution and frame rate), encoding codec, filters, etc.

In some embodiments, video capture interface 334 may include trigger conditions 334.6 for moving between operating modes 334.5. For example, video capture interface 334 may have a default operating mode and one or more other operating modes that are triggered when specific conditions are met. For example, a camera may be configured to default to normal operating mode but change to low-light operating mode when light levels drop below a threshold. In some configurations, a camera may include passive video capture mode as a default mode for continuous video surveillance, due to the lower resource usage, and include one or more triggers conditions 334.6 for changing the operating mode. For example, when motion, a video tripwire, or an object are detected from the passive video data, the video capture interface 334 may change the operating mode to the active video capture mode. However, these video-based triggers may be less reliable using passive video data and there may be a lag between an object entering the field of view and successfully triggering a video condition, including the required processing time for the monitoring analytics. In some embodiments, video capture interface 334 may include one or more trigger conditions 334.6 based on audio data. For example, video capture interface 334 may include an audio event detector 334.7 that processes audio data from an audio field that extends beyond the video field of view and corresponding audio response logic 334.11 for evaluating audio trigger conditions 334.6.

Audio event detector 334.7 may support detection of one or more audio event types based on the audio data received by surveillance controller 330. For example, audio event detector 334.7 may detect patterns in the audio data that correlates to a sound source suggestive of an object of interest on an intercept path with the field of view of one or more video cameras. In some embodiments, a relatively clear approach path, such as a roadway, and a distinct sounds source, such as motor vehicles, may allow audio detector 334.7 to detect audio events based on relatively simple audio pattern matching using conventional audio detection parameters. For example, audio event detector 334.7 may be configured with an audio recognition model based on magnitude, duration, and wave pattern ranges correlating to common motor vehicles driving at speeds appropriate for the audio detection location. In more complex deployments, machine learning may be used to generate an audio recognition model based on a specific deployment, set of audio source types, and the spatial and motion models for predicting an intercept path with the video camera field of view. For example, an audio recognition model may be developed based on machine learning using a set of reference data from the location that has been previously tagged with sound sources of interest and field of view intercepts. In some embodiments, audio recognition models 344.1 may be developed and/or deployed through analytics engine 340 for use by audio event detector 334/7. For example, analytical model library 340 may include one or more machine learning-based audio recognition models that return a sound source type and at least one recognition confidence value, such as a sound source type confidence value and an intercept path confidence value. In some embodiments, due to a relatively low cost of false positives (in terms of added processing, network bandwidth, and data storage), audio recognition models may be simplified such as accepting any sound source on an intercept path or specific sounds sources of interest regardless of intercept path. In some embodiments, audio event detector 334.7 in a surveillance controller onboard a camera may be configured to determine possible audio events (based on relatively simple or lightweight audio recognition models) and interface with analytics engine 340, such as an analytics engine in a network video recorder or network video server, for additional audio event recognition processing.

In some embodiments, microphones may be placed in such a way that the audio recognition model is simplified. For example, one or more directional microphones may be placed such that the act as audio tripwire detectors 334.8. If a sound source breaks the audio field of the directional microphone, it may be assumed to be approaching or leaving the video camera field of view (see FIG. 2B). In some configurations, leaving objects may be excluded based on object exit events from object detection and/or motion tracking based on the video data. Other microphone placement strategies for simplifying the logical complexity and/or computational intensity of the audio recognition model may be possible, such as the prior examples of directing a microphone at a point of ingress (e.g., doorway) or a known path of approach (e.g., roadway).

In some embodiments, one or more audio type identifiers 334.9 may be configured as at least part of the audio recognition models. For example, a group identifier algorithm may be trained based on one or more sets of audio reference data tagged with known audio source types. The resulting audio recognition model (or audio type identifier 334.9 portion thereof) may return one or more audio source type values (e.g., person, dog, motor vehicle, etc. which may be correlated to group number values or other sound source type identifiers) and, for each returned audio source type, a corresponding recognition confidence value (percentage confidence or corresponding decimal value between 0 and 1).

In some embodiments, one or more audio motion identifiers 334.10 may be configured as at least part of the audio recognition models. For example, a spatial model may be trained based on the physical configuration of the space, doppler, reflection, correlation, triangulation, and/or other acoustic models for the audio fields and surrounding location features. In some embodiments, audio motion identifiers 334.10 may include an audio motion tracking algorithm trained using machine learning and one or more reference data sets for the actual location and/or similar locations. For example, the audio motion tracking algorithm may be trained with audio reference data recorded at the location and tagged with known paths of approach (using actual sounds sources of interest and/or training tones for more clearly modeling the acoustics of the space). In some embodiments, audio motion identifiers 334.10 may return a location and an estimated path of motion for the sound source. For example, over a duration of the audio data, a starting location and a sampled path of movement may be determined for the sound source and extrapolated linearly based on the velocity and acceleration during the sampled path. The returned values may also include an estimated intercept location and/or time with the video camera field of view and a corresponding intercept confidence value (percentage confidence or corresponding decimal value between 0 and 1).

In some embodiments, audio response logic 334.11 may include logical rules for applying audio events and their corresponding audio event parameters to trigger conditions 334.6 for triggering one or more operating modes 334.5. For example, audio response logic 334.11 may include a set of threshold values and logical rules for applying those threshold values to triggering modification of the video capture operations. In some embodiments, audio response logic 334.11 may include a set of active capture thresholds for initiating active video capture rate 334.3 and/or a corresponding active video capture mode. For example, audio event detector 334.7 may return an audio event with a sound source type, type confidence value, intercept location, and intercept confidence value. If the sound source type matches an object of interest type, the type confidence value meets a type confidence threshold (e.g., 50%), and the intercept confidence value meets an intercept confidence threshold (e.g., 50%), then audio response logic 334.11 may trigger active video capture rate 334.4. In some embodiments, additional and/or alternative logical rule sets for applying audio event parameters to initializing video capture, triggering PTZ movement toward the intercept location, and/or changing data storage and/or processing paths may be included in audio response logic.

In some embodiments, video capture interface 334 may be configured with an object detector 334.12 supporting detection of one or more object classes, such as people, animals, motor vehicles, etc. For example, object detector 334.12 may operate on captured video data received from a video camera to detect whether an object of interest is present in the video data. In some embodiments, object detector 334.12 may include a lightweight object detection model that can be processed in near real-time with the limited processing bandwidth of the video camera and/or associated compute resources. In some embodiments, the object detection model may operate on the video data in the video stream and return a flag or class for the object type detected, an object quality of confidence metric, object position, and/or object boundary data, such as two horizontal positions and two vertical positions to define a boundary box within the video frame. In some embodiments, object detector 334.12 may have one or more associated object confidence thresholds for evaluating the object confidence value for each object detection event. For example, object detector 334.12 may include an object detection threshold, below which the presence of an object is not treated as sufficiently certain to raise an object detection event, such as 50% reliability. In some embodiments, object detector 334.12 may be used to identify object detection events and raise corresponding alerts and video data handling. For example, trigger conditions 334.6 may include trigger conditions based on object detection in addition to audio detection triggers and trigger corresponding changes in operating modes 334.5.

In some embodiments, video capture interface 334 may include a model training interface 334.13 configured to assist analytics engine 340 in training and/or retraining one or more machine learning based audio recognition models using actual correlations between the outputs of audio event detector 334.7 and object detector 334.12. For example, model training interface 334.13 may evaluate audio events from audio event detector 334.7 to determine whether a subsequent object is detected by object detector 334.12. If the object of interest is detected within a correlation period following an audio event, the audio event data may be selected as new audio reference data and tagged with corresponding audio source type identifiers and/or audio motion identifiers. For example, one or more audio event parameters from audio event detector 334.7 may be used to tag the new audio reference data for training purposes. In some embodiments, new audio reference data may be provided to analytics engine 340 and may be subject to additional verification before being used for retraining purposes. For example, analytics engine 340 may include one or more heavy-duty object detection and/or audio detection models and/or include user verification of new audio reference data from model training interface 334.13.

Video storage interface 336 may include storage interface protocols and a set of functions, parameters, and data structures for managing storage of video data 320.1 and/or audio data 320.4 in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, audio data 320.4 may be stored in separate audio data files or objects and/or as synchronized audio data in audio tracks or channels of video data 320.1. In some embodiments, video storage interface 336 may include a storage manager 336.1 configured to manage video storage space in non-volatile memory 320 in accordance with one or more operating modes 334.5, data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 336.1 may support different storage locations for high quality video 320.2 captured during active video capture modes and low quality video 320.3 captured during passive video capture modes. Video storage interface 336 may also include a metadata manager 336.2 to receive and store video metadata as tags or metadata tracks in the video data or in an associated metadata table, file, or similar data structure associated with the corresponding video data objects. In some embodiments, metadata manager 336.2 may be configured to store audio event data 320.5, such as audio event parameters from a set of audio data 320.4 corresponding to a detected audio event, from audio event detector 334.7 and object data from object detector 334.12 in corresponding metadata structures for use by other system components.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected audio and video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342 and analytical model library 344. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include, support, or supplement event detection by surveillance controller 330, such as audio events from audio event detector 334.7 and/or object detection events from object detector 334.12. In some embodiments, event manager 342 may include a video selector 342.1 configured to select target video streams or video data sets for analysis, including associated audio data. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector 342.2 configured to determine one or more event types to be detected from the selected video data. For example, an analytics configuration may be configured to analyze the selected video stream for a predefined set of audio event detection, motion detection, tripwire detection, object recognition, facial recognition, speech recognition, and/or similar video event types. Each event type may map or correspond to an analytical model type, set of parameters, and one or model weights for defining an event detection algorithm stored in analytical model library 344 for use by analytics engine 340 to detect potential video events (and/or predictive audio events).

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target object classes (e.g., cars, license plates, equipment, people, etc.), and/or training conditions. In some embodiments, analytical model library 344 may also support audio analytical models and/or combined video with audio analytical models. Each analytical model may include a set of base equation(s) for the analytical model type, set of target parameters, and one or model weights that determine the event detection algorithm that will be used for the event detection processing. In some embodiments, at least some analytical models may be machine learning based models trained based on one or more sets of relevant reference data. For example, the base equations may be trained using the reference data sets to determine the model weights to be used in the resulting analytical model. Trained analytical models may be deployed in analytics engine 340 and/or surveillance controller 330. In some embodiments, analytics engine 340 may include or access training services for generating (training) or updating (retraining) analytical models in analytical model library 344.

In some embodiments, analytical model library 344 may include at least one object recognition model 344.1. For example, a motor vehicle recognition model may apply a set of weighted parameter values representing the relationships among sets of feature vectors for comparison with reference data (such as sets of feature vectors for known motor vehicles) and determination of a probabilistic reliability or correlation factor. Analytical model library 344 may include or access object reference data 344.2 for matching detected objects with previously identified (or recognized) reference objects. For example, the motor vehicle recognition model may be applied to a reference database of relevant motor vehicle images and/or feature sets extracted therefrom to provide vehicle reference data. In some embodiments, for any given detected object, object recognition model 344.1 may return one or more recognized matches and a corresponding reliability value. For example, the motor vehicle recognition model may return one or more known individuals from the reference data and corresponding reliability values, assuming at least one match is found that meets a threshold reliability value.

In some embodiments, analytical model library 344 may include at least one audio recognition model 344.3. For example, an audio recognition model for sound source type 334.4 may apply a set of weighted parameter values representing the relationships among sets of audio feature vectors for comparison with reference data (such as sets of feature vectors for known sound source types) and determination of a probabilistic reliability or correlation factor. Analytical model library 344 may include or access audio reference data 344.6 for matching detected audio patterns with previously identified (or recognized) reference audio patterns. For example, the audio recognition model for sound source types may be applied to a reference database of relevant motor vehicle sounds and/or feature sets extracted therefrom to provide vehicle sound reference data. In some embodiments, for any given detected audio event, audio recognition model 344.3 may return one or more recognized matches and a corresponding source type recognition confidence value. For example, the sound source type recognition model may return one or more known sound source type identifiers from the reference data and corresponding reliability or confidence values, assuming at least one match is found that meets an audio recognition threshold 334.5 for the confidence value.

In some embodiments, analytical model library 344 may include at least one spatial motion model 344.7 for tracking movement of a sound source based on audio data. For example, spatial motion model 344.7 may include a spatial model of the audio field and/or adjacent features that impact the propagation and reflection of sound. In some embodiments, the audio field portion of the model may include the specific audio sensor and processing configuration for gathering the acoustic waves, such as a model of a directional microphone. In some embodiments, spatial motion model 344.7 may include a plurality of microphones and the physical locations and/or relationships of those microphones may be included as parameters of the model for locating sound sources and related motion. In some embodiments, spatial motion model 344.7 may be configured independent of sound source type recognition 334.4 and then combined in audio recognition model 344.3. In some embodiments, spatial motion model 344.7 may be configured to identify a starting location for a detected sound source, select a segment of audio data representing a motion sample, and determine a velocity and/or acceleration values for the sample motion. For example, a starting location may include where the sound source entered the audio field and the motion sample may be based on a configured sample duration, such as 1-3 seconds of audio data samples. Based on these inputs, spatial motion model 344.7 may determine direction of movement, speed value, and/or acceleration value and extrapolate a predicted trajectory or path of movement for the sound source. In some embodiments, spatial motion model 344.7 may include a spatial definition of the field of view of one or more cameras and use the predicted path of movement to determine a predicted intercept point between the predicted path and the field of view. In some embodiments, determining the predicted intercept point may also include determining a predicted intercept time (based on the speed with or without acceleration and the last known location from sample). Other configurations of spatial motion models and/or methods of determining sound source location and movement are also possible.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application 350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library 344 for one or more analytics engines 340. In some embodiments, the event detection algorithms may include a set of parameters and/or model weights that are preconfigured based on training data sets processed independent of surveillance system 300. For example, the analytics manager may include audio event detection and object detection algorithms for common objects/sources, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with analytics engine 340 for selecting, training, managing, and using the event detection algorithms configured through the analytics manager. In some embodiments, the analytics manager may interface with access/display manager 338 for accessing and managing one or more analytics engines 340.

Figure 4:
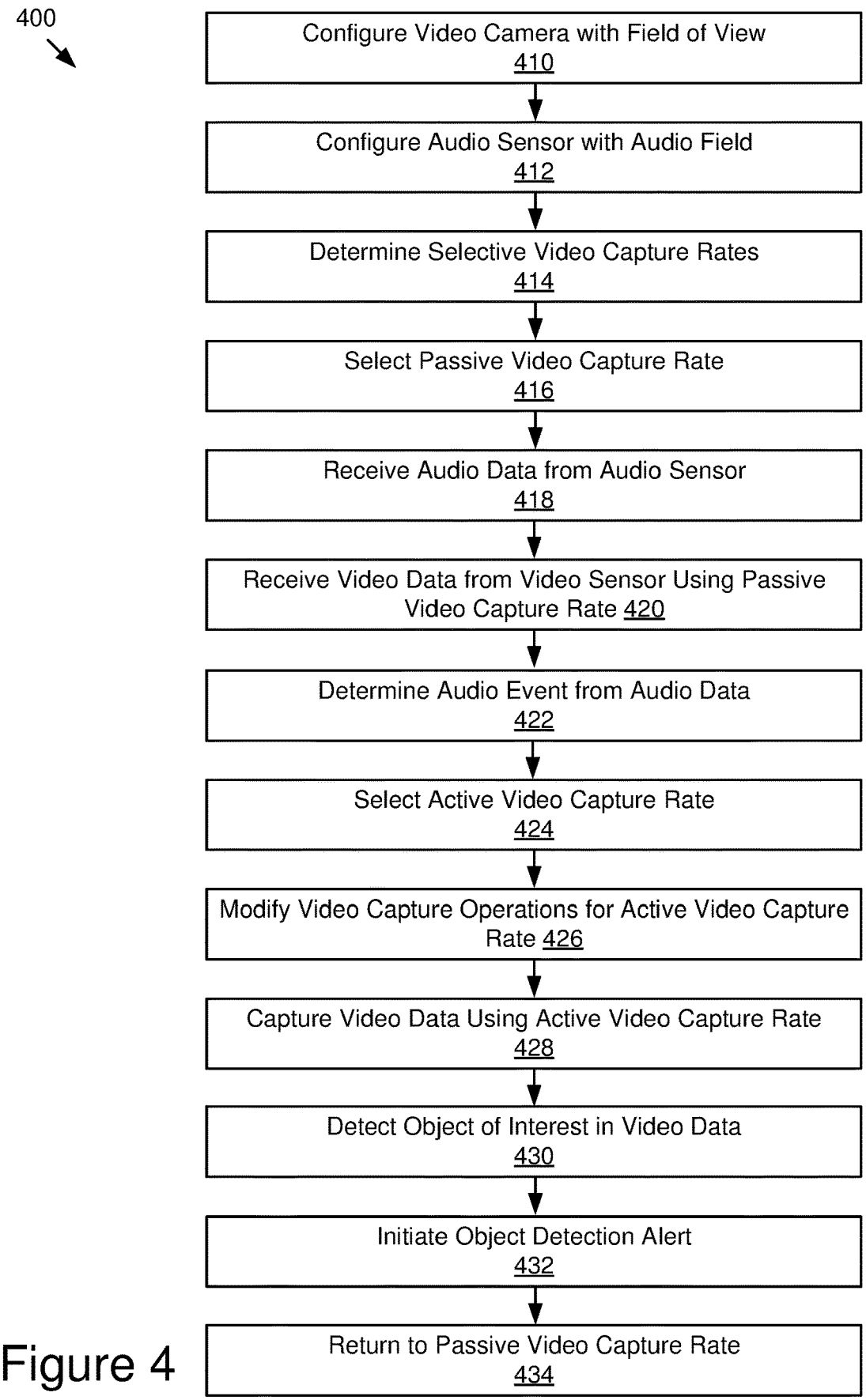
FIG. 4 is a flowchart of an example method modifying video capture operations based on audio events.

As shown in FIG. 4, surveillance system 300 may be operated according to an example method for modifying video capture operations based on audio events, i.e., according to method 400 illustrated by blocks 410-434 in FIG. 4.

At block 410, a video camera may be configured with a field of view. For example, a user may deploy a camera in a surveillance location with a fixed or moveable field of view based on the orientation, size, and depth of field of the image sensors and associated lens(es).

At block 412, an audio sensor may be configured with an audio field. For example, the user may deploy at least one microphone with the video camera, such as a direction microphone directed to a path of approach to the video camera field of view and extending beyond that field of view.

At block 414, selective video capture rates may be determined. For example, the video camera may be configured to support two or more selectable video capture rates, such as a passive video capture rate and an active video capture rate.

At block 416, a passive video capture rate may be selected. For example, the video camera may default to the passive video capture rate to conserve processing power, network bandwidth, and/or storage space until an object of interest is within or approaching the field of view.

At block 418, audio data may be received from an audio sensor. For example, a surveillance controller for the camera may continuously receive audio data from the audio sensor if any sound is detected (for example, based on a sound detection threshold).

At block 420, video data may be received from the video sensor using the passive video capture rate. For example, based on the current operating mode of the camera, the image sensor may be sampled at a lower data capture rate corresponding to the passive video capture rate.

At block 422, an audio event may be determined from the audio data. For example, the surveillance controller may detect a sound level, sound pattern, sound duration, and/or combination thereof meeting the criteria for an audio event.

At block 424, an active video capture rate may be selected. For example, the surveillance controller, responsive to a trigger condition based on the audio event at block 422, may select the operating mode of the video camera to use the active video capture rate.

At block 426, video capture operations may be modified for the active video capture rate. For example, the surveillance controller may change one or more operating parameters for the active video capture operating mode and modify the sampling from the video sensor to increase the video quality.

At block 428, video data may be captured using the active video capture rate. For example, based on the updated operating mode, the video camera may capture and encode video data from the video sensor using the active video capture rate.

At block 430, an object of interest may be detected in the video data. For example, an object corresponding to the sound source may enter the field of view of the video camera and, based on the higher quality video data, an object may be detected sooner by an object detector associated with the video camera and its video data stream.

At block 432, an object detection alert may be initiated. For example, responsive to the object detection at block 430, the surveillance controller and/or an associated analytics engine may raise one or more alerts to other system components, such as a user device running a surveillance application.

At block 434, the passive video capture rate may be returned to. For example, following the object detection event, such as after the detected object leaves the video frame and/or the field of view, the video camera may return to the passive video capture rate and corresponding operating mode.

Figure 5:
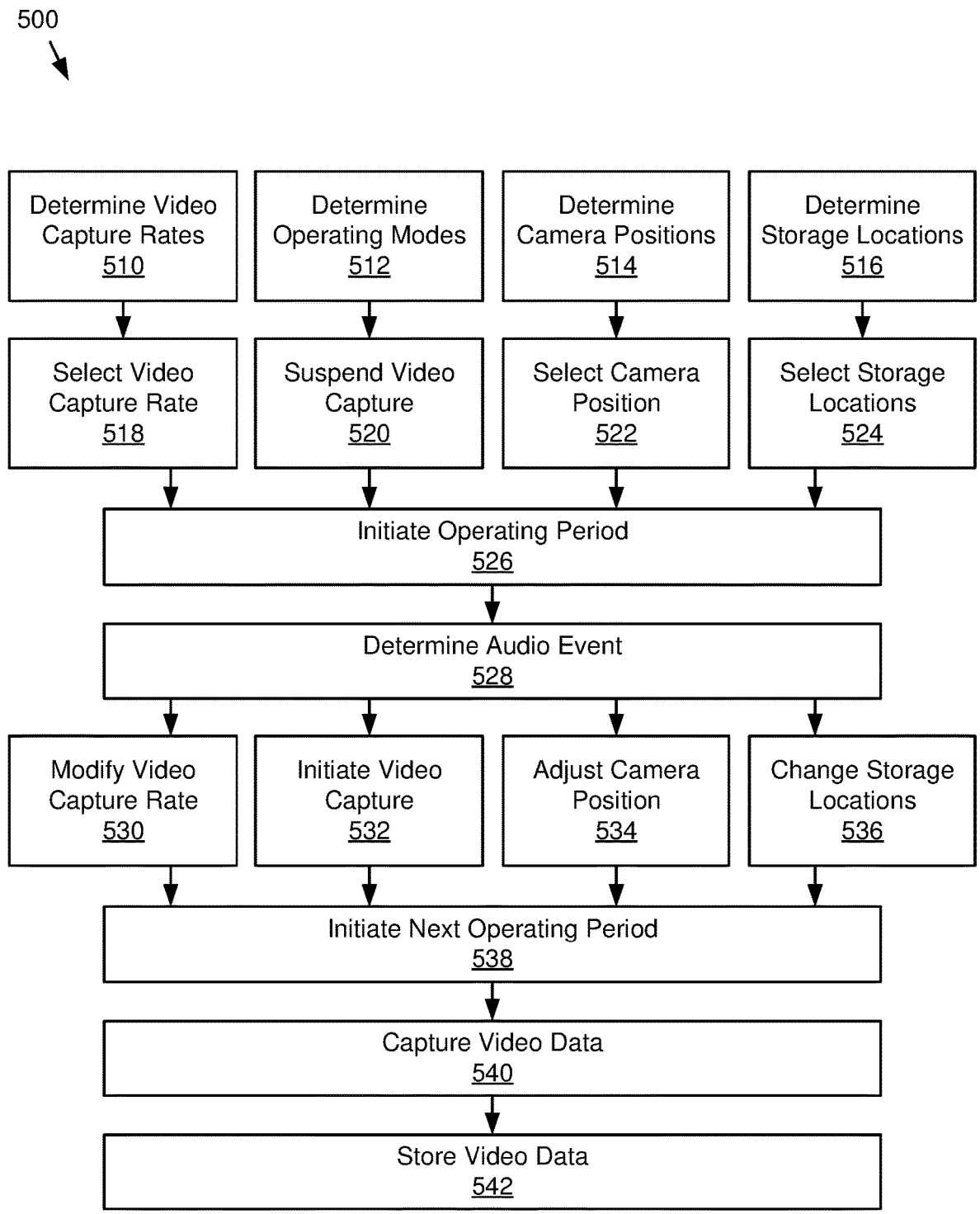
FIG. 5 is a flowchart of another example method of modifying video capture operations based on audio events.

As shown in FIG. 5, surveillance system 300 may be operated according to another example method for modifying video capture operations based on audio events, i.e., according to method 500 illustrated by blocks 510-542 in FIG. 5. In some embodiments, method 500 operate in conjunction with one or more blocks of method 400 in FIG. 4.

At block 510, video capture rates may be determined. For example, a video camera may be configured at manufacture or based on user settings with multiple video capture rates supporting different operating modes of the video camera.

At block 512, operating modes may be determined. For example, the video camera may be configured at manufacture or based on user settings with multiple operating modes that may include operating modes that do and do not include video capture, such as a suspended mode without video capture.

At block 514, multiple camera positions may be determined. For example, upon installation, a video camera configured with PZT functions enabled may determine ranges for pan, tilt, and/or zoom functions and the corresponding camera positions based on continuous and/or step adjustments.

At block 516, storage locations may be determined. For example, upon system configuration, two or more storage locations for video data from the video camera may be determined, such as local storage in a flash memory of the video camera, storage to one or more disk drives in a network video recorder, and/or network video storage in a remote cloud video storage system.

At block 518, a video capture rate may be selected. For example, upon initialization, the video camera may default to a video capture rate, such as a passive video capture rate.

At block 520, video capture mode may be suspended. For example, upon initialization or following a defined period of inactivity, the video camera may enter a suspended mode where the image sensor is not used for capturing and storing video data.

At block 522, a camera position may be determined. For example, upon initialization or as determined by a user, the video camera may be placed in a default or last used position using the PZT controls.

At block 524, one or more initial storage locations may be determined. For example, upon initialization or based on default operating mode, the camera may default to a storage location, such as on-camera non-volatile memory.

At block 526, an operating period may be initiated. For example, the camera may enter a default operating mode with associated operations selected from blocks 518-524.

At block 528, an audio event may be determined. For example, the video camera may detect an audio event from one or more microphones associated with the video camera.

At block 530, the video capture rate may be modified. For example, the camera may switch from a passive video capture rate to an active video capture rate.

At block 532, video capture may be initiated. For example, the camera may change from a suspended operating mode to an active video capture operating mode.

At block 534, the camera position may be adjusted. For example, the camera may use PZT control to move the field of view toward the sound source of the audio event.

At block 536, a storage location may be changed. For example, the camera may direct the captured video to one or more off-camera storage locations for video data storage, analysis, and/or display.

At block 538, a next operating period may be initiated. For example, based on the modifications to the video capture operations selected at blocks 530-536, a next operating period may begin using those selections.

At block 540, video data may be captured. For example, during the current operating period, the video camera may use the modified video capture operations to capture video data from the video image sensor.

At block 542, video data may be stored. For example, during the current operating period, the video camera may send and store the captured video data for the modified video data operations.

Figure 6:
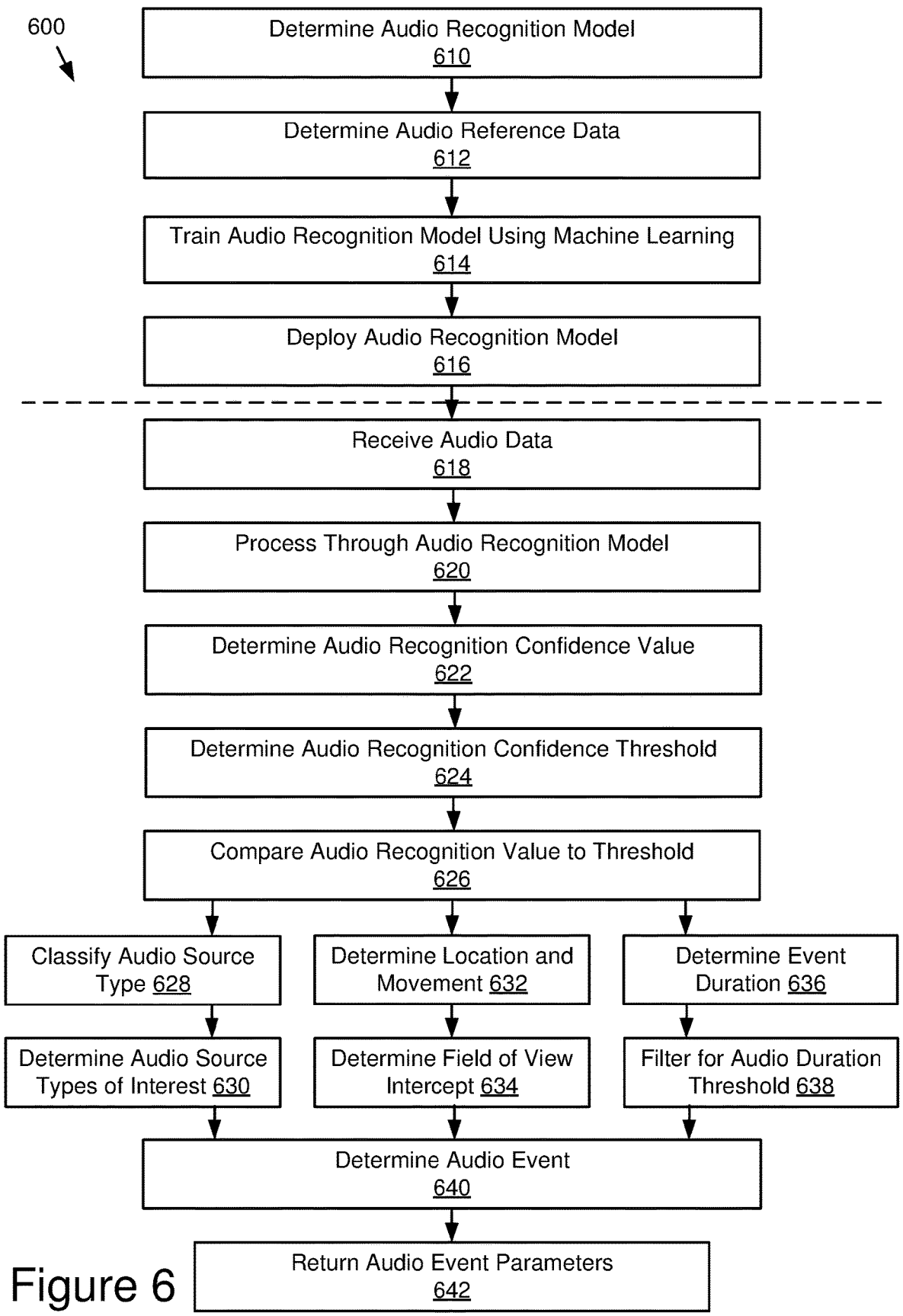
FIG. 6 is a flowchart of an example method of determining audio events from audio data.

As shown in FIG. 6, surveillance system 300 may be operated according to an example method for determining audio events from audio data, i.e., according to method 600 illustrated by blocks 610-654 in FIG. 6. In some embodiments, method 600 may operate in conjunction with one or more blocks of method 400 of FIG. 4 and/or method 500 in FIG. 5. Blocks 610-616 may include a configuration phase for the surveillance system and blocks 618-642 may include an operating phase.

At block 610, an audio recognition model may be determined. For example, an analytics engine may select at least one audio recognition algorithm, such as audio source type grouping algorithms and/or audio location and motion tracking algorithms to be configured through machine learning.

At block 612, audio reference data may be determined. For example, the analytics engine may receive a training data set based on tagged reference audio data for similar camera configurations and/or collected and tagged from the actual deployment of the camera to be configured.

At block 614, the audio recognition model may be trained using machine learning. For example, the analytics engine may invoke a training service to use the audio reference data to training one or more audio recognition algorithms using a machine learning model to generate node weighting values and/or other parameters for the algorithms being used.

At block 616, the audio recognition model may be deployed. For example, the audio recognition model or models may be instantiated in the video camera, surveillance controller, and/or analytics engine for processing audio data from the field in real-time or near real-time to predict possible object detection opportunities.

At block 618, audio data may be received. For example, the video camera may receive audio data from a microphone deployed in close proximity to the video camera for capturing acoustic signals from sound sources outside the field of view of the camera.

At block 620, the audio data may be processed through the audio recognition model. For example, audio data meeting at least a threshold magnitude of audio signal content may be processed through the deployed audio recognition model.

At block 622, at least one audio recognition confidence value may be determined for the audio recognition model. For example, the audio recognition model may generate at least one output parameter, such as audio source type, audio source location, audio source velocity, audio source estimated field of view intercept, and at least one corresponding audio recognition confidence value based on the likelihood that the output parameter is true.

At block 624, at least one audio recognition confidence threshold may be determined. For example, the video camera may apply threshold values for each recognition confidence value determined at block 622 to determine whether the likelihood of the output parameter is high enough to act upon.

At block 626, the audio recognition values may be compared to the corresponding thresholds. For example, the video camera may determine whether each threshold is met by the sample of audio data being evaluated.

At block 628, audio source type may be classified. For example, the audio recognition model may determine at least one audio source type for the audio data sample. At block 630, whether the audio source is an audio source type of interest may be determined. For example, the audio recognition model may be configured for audio sources of interest and/or audio response logic may filter the returned audio source types for sources of interest.

At block 632, a location and movement of the audio source may be determined. For example, the audio recognition model may determine a location of the sound source relative to the field of view and a direction and speed of the sound source. At block 634, a field of view intercept may be determined. For example, the audio recognition model and/or audio response logic may calculate where and when the sound source is predicted to enter the field of view of the camera based on the location and velocity of the sound source.

At block 636, an event duration may be determined. For example, the audio recognition model may be configured for a minimum audio sample duration for determining one or more output parameters. At block 638, possible audio events may be filtered based on an audio duration threshold. For example, the audio recognition model and/or audio response logic may use the minimum audio sample duration as the audio duration threshold for filtering audio samples with audio duration values below the threshold.

At block 640, an audio event may be determined. For example, the audio recognition model and/or audio response logic may return an audio event indicator for audio data samples meeting audio event criteria.

At block 642, audio event parameters may be returned. For example, the audio recognition model and/or audio response logic may return audio recognition parameters for use in evaluating one or more trigger conditions for modifying operating modes of the video camera.

Figure 7:
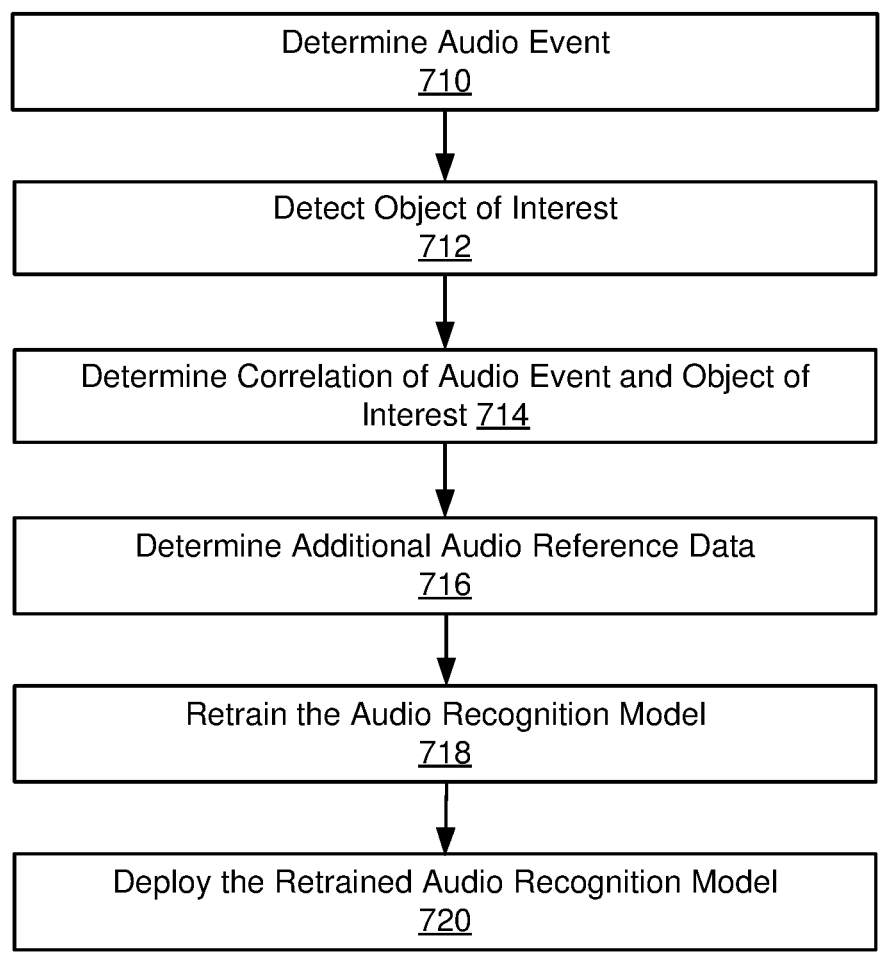
FIG. 7 is a flowchart of an example method of retraining an audio recognition model.

As shown in FIG. 7, surveillance system 300 may be operated according to an example method for retraining an audio recognition model, i.e., according to method 700 illustrated by blocks 710-720 in FIG. 7. In some embodiments, method 700 may operate in conjunction with one or more blocks of method 400 of FIG. 4, method 500 in FIG. 5, and/or method 600 in FIG. 6.

At block 710, an audio event may be determined from the audio data. For example, the surveillance system may detect a sound level, sound pattern, sound duration, and/or combination thereof meeting the criteria for an audio event, such as based on an audio recognition model and related thresholds.

At block 712, an object of interest may be detected in the video data. For example, an object corresponding to the sound source may enter the field of view of the video camera and, based on the video data, an object may be detected by an object detector associated with the video camera and its video data stream.

At block 714, a correlation may be determined between the audio event and the object of interest. For example, the surveillance system may compare a timestamp for an audio event with one or more detected objects following the audio event to determine whether the audio event correctly predicted an object of interest entering the field of view.

At block 716, additional audio reference data may be determined. For example, the audio data sample corresponding to the detected audio event and the resulting audio recognition parameters and/or object parameters may be selected to provide audio reference data for retraining the audio recognition model.

At block 718, the audio recognition model may be retrained. For example, the additional audio reference data may be added to a training data set and used by a machine learning training service to determine updated weightings or other parameters for the audio recognition model.

At block 720, the retrained audio recognition model may be deployed. For example, the audio recognition model with the updated weightings or other parameters may be deployed for use in future audio event detection determinations.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
    a video camera configured for a plurality of video capture rates;
    an audio sensor, wherein:
        the audio sensor is configured to collect audio data from an audio field; and
        the audio field is at least partially outside a field of view of the video camera; and
    a controller configured to:
        receive audio data from the audio sensor;
        determine, from the audio data, an audio event;
        select, responsive to the audio event, a first video capture rate from the plurality of video capture rates;
        modify, responsive to the audio event, a video capture operation of the video camera using the first video capture rate during a first operating period; and
        capture, using the video camera, video data based on the modified video capture operation.

2. The system of claim 1, wherein the controller is further configured to select a second video capture rate from the plurality of video capture rates during a second operating period.

3. The system of claim 1, wherein the controller is further configured to:
    suspend video capture during a second operating period; and
    initiate, responsive to the audio event, video capture at the first video capture rate to modify the video capture operation during the first operating period.

4. The system of claim 1, wherein:
    the audio event is associated with a video object of interest; and
    the audio event precedes the video object being detectable in the field of view of the video camera.

5. The system of claim 1, wherein:
    the audio sensor comprises at least one directional microphone configured with a direction and an audio range to detect sound sources outside the field of view of the video camera; and
    the controller is further configured to determine, based on the audio data, a direction of movement of a sound source that intercepts the field of view of the video camera.

6. The system of claim 5, wherein the at least one directional microphone is configured as an audio tripwire for the sound source approaching the field of view of the video camera.

7. The system of claim 1, further comprising:
    an analytics engine configured to:
        receive the audio data from the audio sensor;
        determine, in the audio data, the audio event, wherein determining the audio event is based on:
            an audio recognition value meeting an audio recognition threshold; and an audio duration value meeting an audio duration threshold; and return the audio event for use by the controller.

8. The system of claim 7, wherein:

the analytics engine is further configured to use an audio recognition model to determine the audio recognition value;

the audio recognition model is configured to classify the audio data using at least one audio source type identifier; and the controller is further configured to use the at least one audio source type identifier to determine a modification of the video capture operation of the video camera.

9. The system of claim 7, wherein:

the analytics engine is further configured to use an audio recognition model to determine the audio recognition value;

the audio recognition model is configured to determine a location and a direction of movement of a sound source; and the controller is further configured to send, responsive to the location and the direction of movement of the sound source, a pan-tilt-zoom position control signal to the video camera to adjust the field of view of the video camera.

10. The system of claim 7, wherein:

the analytics engine is further configured to use an audio recognition model to determine the audio recognition value;

the audio recognition model is a machine learning model trained with audio reference data corresponding to known sound sources;

the controller is further configured to:

detect, using the video data, at least one data object in the field of view of the video camera; and determine, based on correlations of the audio event and detecting at least one data object, additional audio reference data; and the analytics engine is further configured to retrain the machine learning model using the additional audio reference data.

11. A computer-implemented method, comprising:

collecting, by an audio sensor, audio data from an audio field, wherein the audio field is at least partially outside a field of view of a video camera;

receiving the audio data from the audio sensor;

determining, based on the audio data, an audio recognition value;

determining, from the audio data, an audio event based on the audio recognition value meeting an audio recognition threshold;

modifying, responsive to the audio event, a video capture operation of the video camera; and capturing, using the video camera, video data based on the modified video capture operation.

12. The computer-implemented method of claim 11, further comprising:

selecting a first video capture rate from a plurality of video capture rates for the video camera during a first operating period; and selecting, responsive to the audio event, a second video capture rate to modify the video capture operation during a second operating period.

13. The computer-implemented method of claim 11, further comprising:

suspending video capture during a first operating period; and initiating, responsive to the audio event, video capture at a selected video capture rate to modify the video capture operation during a second operating period.

14. The computer-implemented method of claim 11, wherein:

the audio event is associated with a video object of interest; and the audio event precedes the video object being detectable in the field of view of the video camera.

15. The computer-implemented method of claim 11, further comprising:

determining, based on the audio data, a direction of movement of a sound source that intercepts the field of view of the video camera, wherein the audio sensor comprises at least one directional microphone configured with a direction and an audio range to detect sound sources outside the field of view of the video camera.

16. The computer-implemented method of claim 15, further comprising configuring the at least one directional microphone as an audio tripwire for the sound source approaching the field of view of the video camera.

17. The computer-implemented method of claim 11, further comprising:

determining the audio recognition value using an audio recognition model;

classifying, using the audio recognition model, the audio data using at least one audio source type identifier; and determining, using the at least one audio source type identifier, a modification of the video capture operation of the video camera.

18. The computer-implemented method of claim 11, further comprising:

determining the audio recognition value using an audio recognition model;

determining, using the audio recognition model, a location and a direction of movement of a sound source; and adjusting, responsive to the location and the direction of movement of the sound source, the field of view of the video camera using a pan-tilt-zoom position control signal.

19. The computer-implemented method of claim 11, further comprising:

determining the audio recognition value using an audio recognition model;

training, using a machine learning model and audio reference data corresponding to known sound sources, the audio recognition model;

detecting, using the video data, at least one data object in the field of view of the video camera;

determining, based on correlations of the audio event and detecting at least one data object, additional audio reference data; and retraining, using the machine learning model and the additional audio reference data, the audio recognition model.

20. A storage system, comprising:

a video camera;

an audio sensor, wherein:

the audio sensor is configured to collect audio data from an audio field;

the audio field is at least partially outside a field of view of the video camera; and the audio sensor comprises at least one directional microphone configured with a direction and an audio range to detect sound sources outside the field of view of the video camera;

a processor;

a memory;

means for collecting, by the audio sensor, audio data from the audio field;

means for determining, from the audio data, an audio event based on determining a direction of movement of a sound source that intercepts the field of view of the video camera;

means for modifying, responsive to the audio event, a video capture operation of the video camera; and means for capturing, using the video camera, video data based on the modified video capture operation.

\* \* \* \* \*